United States Patent
Yuan (10) Patent No.: US 12,315,247 B2
(45) Date of Patent: May 27, 2025

(54) GENERATING SYNTHETIC GROUND-LEVEL DATA BASED ON GENERATOR CONDITIONED FOR PARTICULAR AGRICULTURAL AREA

(71) Applicant: Deere & Company, Moline, IL (US)

(72) Inventor: Zhiqiang Yuan, San Jose, CA (US)

(73) Assignee: Deere & Company, Moline, IL (US)

( * ) Notice: Subject to any disclaimer, the term of this patent is extended or adjusted under 35 U.S.C. 154(b) by 772 days.

(21) Appl. No.: 17/540,037

(22) Filed: Dec. 1, 2021

(65) Prior Publication Data

US 2023/0169764 A1    Jun. 1, 2023

(51) Int. Cl.
G06V 20/10    (2022.01)
G06N 3/045    (2023.01)
(Continued)

(52) U.S. Cl.
CPC ........... *G06V 20/188* (2022.01); *G06N 3/045* (2023.01); *G06T 7/0012* (2013.01); *G06T 11/00* (2013.01);
(Continued)

(58) Field of Classification Search
CPC ... G06T 7/0012; G06T 11/00; G06T 2200/24; G06T 2207/20084; G06T 2207/30188;
(Continued)

(56) References Cited

U.S. PATENT DOCUMENTS

| | | | |
|---|---|---|---|
| 2019/0073534 A1* | 3/2019 | Dvir | G06V 10/56 |
| 2020/0364843 A1* | 11/2020 | Stueve | G06V 10/764 |
| 2022/0198221 A1* | 6/2022 | Avegliano | G06N 3/045 |

OTHER PUBLICATIONS

Deng et al., "What is it like down there? generating dense ground-level views and image features from overhead imagery using conditional generative adversarial networks." Proceedings of the 26th ACM SIGSPATIAL International Conference on Advances in Geographic Information Systems. 2018. (Year: 2018).*

(Continued)

*Primary Examiner* — Vu Le
*Assistant Examiner* — Tracy Mangialaschi
(74) *Attorney, Agent, or Firm* — HANLEY, FLIGHT & ZIMMERMAN, LLC (57) ABSTRACT

Implementations are described herein for conditioning a generator machine learning model to generate synthetic ground-level data that is biased towards a given agricultural area based on high-elevation images. In various implementations, a plurality of ground-level images may be accessed that depict crops within a specific agricultural area. A first set of high-elevation image(s) may also be accessed that depict the specific agricultural area. The ground-level images and the first set of high-elevation image(s) may be used to condition an air-to-ground generator machine learning model to generate synthetic ground-level data from high-elevation imagery depicting the specific agricultural area. A second set of high-elevation image(s) that depict a specific sub-region of the specific agricultural area may then be accessed and processed using the air-to-ground generator machine learning model to generate synthetic ground-level data that infers one or more conditions of the specific sub-region of the specific agricultural area.

24 Claims, 6 Drawing Sheets

(51) Int. Cl.
*G06T 7/00* (2017.01)
*G06T 11/00* (2006.01)
*G06V 10/774* (2022.01)
*G06V 10/80* (2022.01)
*G06V 20/13* (2022.01)
*G06V 20/17* (2022.01)

(52) U.S. Cl.
CPC .......... *G06V 10/774* (2022.01); *G06V 10/803* (2022.01); *G06V 20/13* (2022.01); *G06V 20/17* (2022.01); *G06T 2200/24* (2013.01); *G06T 2207/10032* (2013.01); *G06T 2207/20081* (2013.01); *G06T 2207/20084* (2013.01); *G06T 2207/30188* (2013.01); *G06T 2207/30252* (2013.01)

(58) Field of Classification Search
CPC . G06T 2207/20081; G06T 2207/30252; G06T 2207/10032; G06V 10/774; G06V 10/803; G06V 10/82; G06V 20/13; G06V 20/17; G06V 20/56; G06V 20/188; G06N 3/047; G06N 3/045; G06N 3/08
See application file for complete search history.

(56) References Cited

OTHER PUBLICATIONS

Regmi, Krishna, and Ali Borji. "Cross-view image synthesis using conditional gans." Proceedings of the IEEE conference on Computer Vision and Pattern Recognition. 2018. (Year: 2018).*

Zhu et al., "Unpaired Image-to-Image Translation using Cycle-Consistent Adversarial Networks" arXiv:1703.10593v7 [cs.CV] dated Augsust 24, 2020. 18 pages.

Yang et al., "Cross-view Geo-localization with Evolving Transformer" arXiv:2107.00842v2 [cs.CV] dated Jul. 5, 2021. 11 pages.

Regmi et al., "Corss-view image synthesis using geometry-guided conditional GAN's" arXiv:1808.05469v2 [cs.CV] dated Jul. 18, 2019. 11 pages.

Deng et al., "What Is It Like Down There? Generationg Dense Ground-Level Views and Image Features From Overhead Imagery Using Conditional Generative Adversarial Networks" arXiv:1806.05129v2 [cs.CV] dated Sep. 23, 2018. 10 pages.

Regmi et al., "Bridging the Domain Gap for Ground-to-Aerial Image Matching" arXiv:1904.11045v2 [cs.CV] Aug. 9, 2019. 14 pages.

* cited by examiner

ACCESS A PLURALITY OF GROUND-LEVEL IMAGES THAT DEPICT CROPS WITHIN A SPECIFIC AGRICULTURAL AREA
502

ACCESS A FIRST SET OF ONE OR MORE HIGH-ELEVATION IMAGES THAT DEPICT CROPS WITHIN THE SPECIFIC AGRICULTURAL AREA
504

USING THE PLURALITY OF GROUND-LEVEL IMAGES AND THE FIRST SET OF ONE OR MORE HIGH-ELEVATION IMAGES, CONDITION AN AIR-TO-GROUND GENERATOR MACHINE LEARNING MODEL TO GENERATE SYNTHETIC GROUND-LEVEL DATA FROM HIGH-ELEVATION IMAGERY DEPICTING THE SPECIFIC AGRICULTURAL AREA
506

ACCESS A SECOND SET OF ONE OR MORE HIGH-ELEVATION IMAGES THAT DEPICT A SPECIFIC SUB-REGION OF THE SPECIFIC AGRICULTURAL AREA
508

PROCESSING THE SECOND SET OF ONE OR MORE HIGH-ELEVATION IMAGES USING THE AIR-TO-GROUND GENERATOR MACHINE LEARNING MODEL TO GENERATE SYNTHETIC GROUND-LEVEL DATA THAT INFERS ONE OR MORE CONDITIONS OF THE SPECIFIC SUB-REGION OF THE SPECIFIC AGRICULTURAL AREA
510

GENERATING SYNTHETIC GROUND-LEVEL DATA BASED ON GENERATOR CONDITIONED FOR PARTICULAR AGRICULTURAL AREA

BACKGROUND

Vision data captured from various elevations, such as ground-level vision data captured by a vision sensor mounted to a farm tractor or high-elevation vision data captured by a satellite, are useful for a variety of agricultural monitoring purposes. Vision data of crop fields can be used to make various agricultural predictions and inferences, particularly when operational and/or other observational data describing ground-level conditions and/or agricultural practices in the field is available. For example, it is beneficial to frequently observe crop fields for crop health, pests, weeds, disease, and/or irrigation monitoring purposes. As another example, it is beneficial to observe the response of crops to application of a new fertilizer or pesticide.

SUMMARY

Vision data captured from high elevations, such as satellite imagery, images captured by high-elevation unmanned aerial vehicles (e.g., UAV "drones" or balloons), manned aircraft (e.g., airplanes), or images captured by high elevation manned aircraft (e.g., space shuttles), are useful for a variety of agricultural monitoring processes. For one thing, acquiring digital imagery from high elevations allows large expanses of land to be captured in the imagery with relatively little effort (beyond sunk costs associated with the satellite). On the other hand, a challenge of high-elevation digital imagery is that 30-60% of such images tend to be obstructed by clouds, shadows, haze and/or snow depending on the location and time. Transient obstructions such as clouds make high-elevation digital images less useful, reduce their business and scientific value, and/or decrease the user experience with applications that rely on high-elevation digital images. For example, clouds introduce gaps in observations made during agricultural monitoring, potentially leaving key information unavailable for use.

Vision data captured from ground-level elevations is also useful for a variety of agricultural monitoring processes. Ground-level vision data can be gathered in a variety of ways, such as by vision sensors mounted to farm machinery (e.g., tractors) and images taken by farm personnel or agricultural ground-based robots/rovers via fixed or mobile cameras available on the farm. However, operating farm machinery through an entire field or farm can be cumbersome and expensive, particularly if it is done often and/or if the field in question is large, which is often the case. Moreover, the vision sensors attached to such machinery only capture a limited field of view and perspective. Thus, while the vision data captured at ground-level may be highly detailed, the usefulness of such vision data may be limited to extrapolating conditions of only certain portions of a farm or field.

One challenge of using vision data to infer conditions in an agricultural environment is that, even when both high-elevation and ground-level vision data are available, there may be gaps in the imagery. For example, a vision sensor mounted on a tractor may frequently gather vision data capturing the portions of crop fields visible from a path within the farm, but may infrequently or never gather vision data capturing other portions of the crop fields where the tractor does not usually go. Likewise, satellite imagery may capture most of a crop field at a first time when a small portion of the field is blocked by clouds. At a later date, satellite imagery may capture the small portion of the crop field as well as a few other portions, but the view of another portion of the field may be blocked. These satellite images may be taken days, weeks, months, or years apart. Thus, the available vision data for a given farm or field may include only ground-level vision data, only high-elevation vision data, or some overlap of the two for various points in time and space.

Implementations are described herein for using machine learning model(s) to generate, from high-elevation digital imagery, synthetic ground-level data that represents, infers, and/or predicts conditions of various portions of crop fields or farms. More particularly, but not exclusively, implementations are described herein for "conditioning" or "biasing" a generator machine learning model to generate synthetic ground-level data for a particular agricultural area. Such synthetic ground-level data may include, for example, one or more synthetic ground-level images, or other synthetic data that predicts ground-level condition(s). Thus, even for crop fields or portions of crop fields not captured by ground-level vision sensors, or not captured by the ground-level vision sensors during certain time periods, agricultural predictions and inferences can still be made that are tailored towards the specific agricultural area and it's context. A context of the agricultural area may include, for instance, current conditions, a current season, etc.

In some implementations, the generator machine learning model may take the form of an air-to-ground generator model of a generative adversarial network ("GAN"). The air-to-ground generator model may be trained alongside a ground-level discriminator model to translate high-elevation digital images from a high-elevation domain to a ground-level domain, e.g., to generate quasi-realistic synthetic ground-level training images from the high-elevation digital images. GANs are advantageous in general because they do not require labeled training data, and therefore can undergo unsupervised training.

In some implementations, multiple generator and discriminator models may be employed to train the generator model. For example, a type of GAN referred to as "CycleGAN" may include two generators: a ground-to-air generator to convert "real" ground-level digital images capturing a first area to "synthetic" high-elevation digital images of the first area; and an air-to-ground generator to convert "real" high-elevation digital images of a second area to "synthetic" ground-level digital images of the second area. In some implementations, the generator models may additionally recognize and label features (e.g., clouds, water, crop or pest types, farm equipment, etc.) that are identifiable from the digital images. Thus, high-granularity ground-level data can be generated for a particular farm or field for which there is higher-granularity ground-level vision data for one portion of the farm/field, and lower-granularity high-elevation vision data for another portion of the farm/field (which may or may not include the first portion).

CycleGANs are advantageous generally because they do not require paired image data for training purposes. Techniques described herein provide an additional advantage by leveraging paired image data in the form of limited ground-level images of a particular agricultural area (e.g., a field, a whole farm) coupled with corresponding high-elevation imagery of the same area. By conditioning the generators of the CycleGAN based on this paired image data, the generators may generate synthetic data (e.g., synthetic ground-level imagery) that more accurately infers the context and conditions of the particular agricultural area.

Similarly, a high-elevation discriminator model may be trained to classify an image as "real" or "synthetic" high-elevation images. Once these models are trained, the ground-to-air generator model(s) may be well-suited to translate "real" ground-level data into "synthetic" high-elevation data, and the air-to-ground generator may be well-suited to translate "real" high-elevation data into "synthetic" ground-level data. This synthetic ground-level data may include labels (which may take various forms, such as pixel-wise annotations, bounding boxes, key points etc.) of features inferred from the source and/or resulting images. In some implementations, a separate phenotyping machine learning model may process the "real" and/or "synthetic" ground-level data to generate the inferences and corresponding labels to be applied to the digital images.

In some implementations, the synthetic ground-level data may be provided to a client application executing on a computing device accessible to agricultural personnel, thus allowing the agricultural personnel to view portions of the crop fields for which they would otherwise have little ground-level data. Predictions and/or inferences made based on the synthetic ground-level data may likewise be provided to the client application for use by the agricultural personnel.

In some implementations, a method implemented using one or more processors may include: accessing a plurality of ground-level images that depict crops within a specific agricultural area; accessing a first set of one or more high-elevation images that depict the specific agricultural area; using the plurality of ground-level images and the first set of one or more high-elevation images, conditioning an air-to-ground generator machine learning model to generate synthetic ground-level data from high-elevation imagery depicting the specific agricultural area; accessing a second set of one or more high-elevation images that depict a specific sub-region of the specific agricultural area, wherein the second set of one or more high-elevation images include: one or more portions of one or more of the high-elevation images of the first set, or one or more additional high-elevation images; and processing the second set of one or more high-elevation images using the air-to-ground generator machine learning model to generate synthetic ground-level data that infers one or more conditions of the specific sub-region of the specific agricultural area.

In various implementations, the synthetic ground-level data that infers the one or more conditions of the specific sub-region includes synthetic ground-level images. In various implementations, the conditioning includes: processing the plurality of ground-level images based on a ground-to-air generator machine learning model to generate one or more synthetic high-elevation images; processing the one or more synthetic high-elevation images based on a high-elevation discriminator machine learning model to generate high-elevation discriminator output; and based on the high-elevation discriminator output, training the ground-to-air generator machine learning model.

In various implementations, the conditioning further includes: processing the one or more synthetic high-elevation images based on the air-to-ground generator machine learning model to generate ground-level images; processing the ground-level images based on a ground-level discriminator machine learning model to generate ground-level discriminator output; and based on the ground-level discriminator output, training the air-to-ground generator machine learning model.

In various implementations, at least one of the high-elevation images of the first set of one or more high-elevation images comprises a synthetic high-elevation image generated based on processing one or more of the ground-level images using a ground-to-air generator machine learning model. In various implementations, the method further includes processing the synthetic ground-level images based on a phenotyping machine learning model to generate one or more agricultural inferences about crops in the specific sub-region of the specific agricultural area. In various implementations, method further includes: providing, to a client application, one or more of the synthetic ground-level images for display on a user interface of the client application; receiving, from the client application, user selection data indicating a user selection of at least a portion of at least one of the one or more synthetic ground-level images displayed on the user interface of the client application; and providing, to the client application and responsive to receiving the user selection data, at least one of the one or more agricultural inferences for display on the user interface.

In various implementations, the first set of one or more high-elevation images are captured by one or more satellites. In various implementations, the first set of one or more high-elevation images are captured by one or more unmanned aerial vehicles (UAVs). In various implementations, the plurality of ground-level images may be captured by a ground-based robot travelling through the specific agricultural area.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
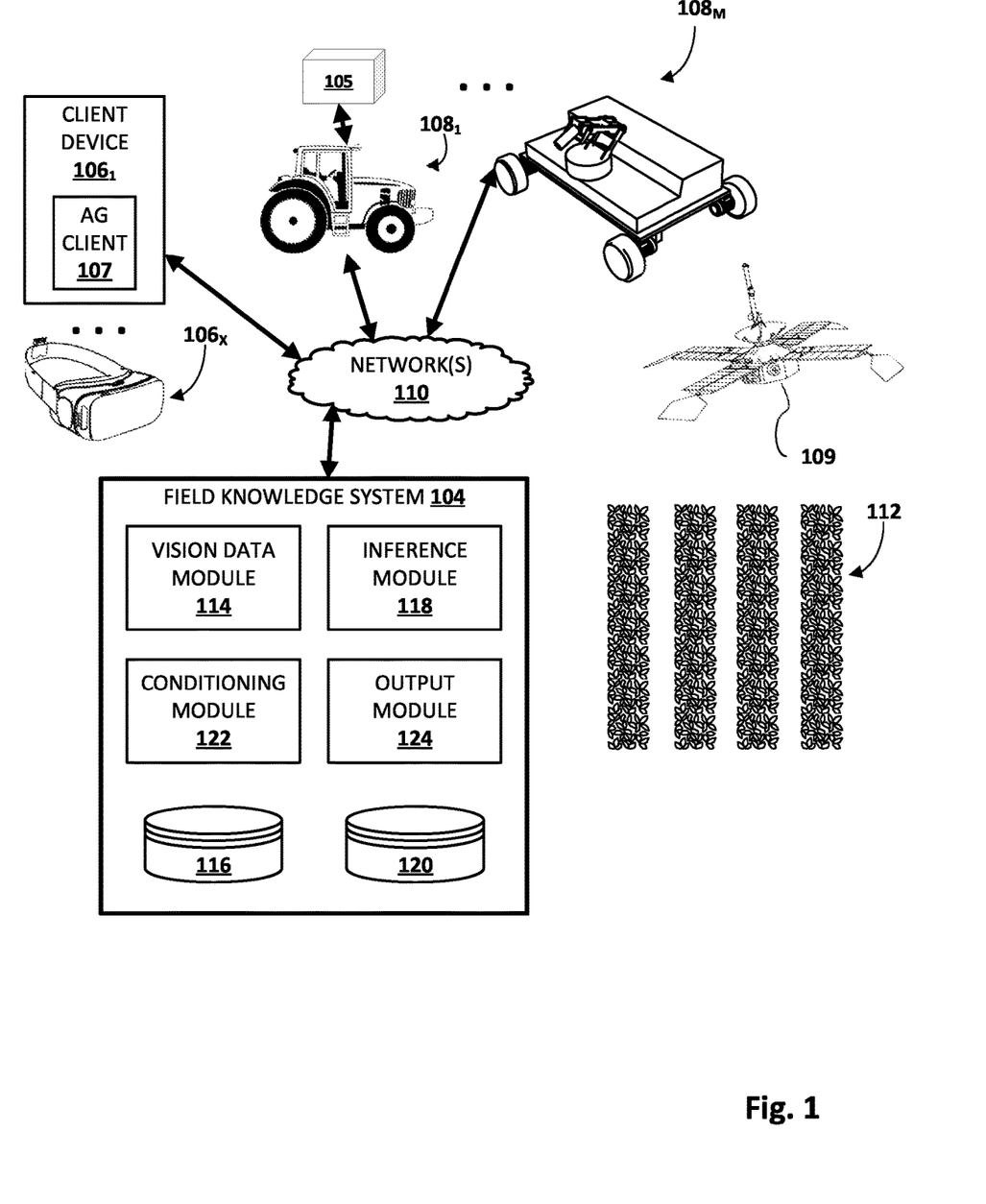
FIG. 1 schematically illustrates an environment in which one or more selected aspects of the present disclosure may be implemented, in accordance with various implementations.

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may include one or more agricultural fields used to grow various types of crops that may produce plant parts of economic and/or nutritional interest. Agricultural area(s) 112 may include, for instance, one or more crop fields, one or more plots, one or more gardens, one or more greenhouses, or any other areas in which there may be an interest or desire to automatically detect, classify, and/or segment plants having particular targeted traits. Plant traits may take various forms, including but not limited to plant types (e.g., genus, species, variety, etc.), plant gender, various observable characteristics of a plant resulting from an interaction of the plant's genotype with its environment ("phenotype"), plant disease, stage of growth, presence/absence of some targeted gene/gene sequence, etc. As one non-limiting example, there may be considerable interest and/or benefit in automatically detecting plants having a trait of being "infested" (e.g., suffering extensive damage due to pests or disease) in an area 112 in which other desired plants are being grown. Once detected, various remedial actions may be taken, such as flagging the infested plants' locations for removal or treatment (e.g., pesticide or fungicide application) by agricultural personnel and/or farming equipment.

An individual (which in the current context may also be referred to as a "user") may operate one or more client devices $106_{1-X}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_X$ that provides an AR or VR immersive computing experience, a "smart" watch, and so forth. Additional and/or alternative client devices may be provided.

Field knowledge system 104 is an example of an information system in which the techniques described herein may be implemented. Each of client devices 106 and field knowledge system 104 may include one or more memories for storage of data and software applications, one or more processors for accessing data and executing applications, and other components that facilitate communication over a network. The operations performed by client device 106 and/or field knowledge system 104 may be distributed across multiple computer systems.

Each client device 106 may operate a variety of different applications that may be used to perform various agricultural tasks, such as crop yield prediction and diagnosis. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, output module 124 (described in more detail below) may generate a report, a map, instructions, and/or any other data that may be presented to an operator of a client device using a graphical user interface, audibly, etc. These data may inform the agricultural personnel where plants having targeted traits (e.g., weeds, diseased plants, plants have desired characteristics, etc.) or portions of fields or plots experiencing certain conditions (e.g., flooding, drought, presence of pests or plant diseases, etc.) are located, what action(s) should be taken on those plants, plots, or fields, and a timeframe in which those action(s) should be taken.

In some implementations, farm machinery $108_{1-M}$ may be deployed to perform various agricultural tasks. Performance of some of these tasks—including but not limited to weed remediation, plant harvesting, etc.—may be performed by applying machine learning model(s) to synthetic ground-level data created using techniques described herein. Farm machinery $108_{1-M}$ may take various forms, such as a tractor $108_1$, a robot (not depicted) that is propelled along a wire, track, rail or other similar component that passes over and/or between crops, a wheeled robot $108_M$, or any other form of farm machinery capable of being propelled or propelling itself past crops of interest.

In some implementations, different farm machinery may have different roles, e.g., depending on their capabilities. For example, in some implementations, one or more pieces of ground-based farm machinery $108_{1-M}$ may be designed to capture data, others may be designed to manipulate plants or perform physical agricultural tasks, and/or others may do both. Farm machinery 108 may include and/or be equipped with various types of sensors, such as vision sensors (e.g., 2D digital cameras, 3D cameras, 2.5D cameras, infrared cameras, etc.), inertial measurement unit ("IMU") sensors, Global Positioning System ("GPS") sensors, X-ray sensors, moisture sensors, lasers, barometers (for local weather information), photodiodes (e.g., for sunlight), thermometers, etc. In some implementations, one or more sensor-equipped modular computing devices 105 (alternatively referred to as "sensor packages") can be mounted on agricultural vehicles (e.g., to tractor $108_1$), or parts attached to agricultural vehicles (e.g., a sprayer or boom affixed to tractor $108_1$), to allow data gathering from the various portions of various fields that each type of agricultural vehicle travels through.

Vision sensors (e.g., 2D digital cameras, 3D cameras, 2.5D cameras, infrared cameras, etc.) can also be deployed at high-elevations via one or more satellites 109 or unmanned aerial vehicles (not depicted). High-elevation vision data gathered in this manner can be used alongside ground level vision data and other sensor data gathered at low elevations by farm machinery $108_{1-M}$ to make various agricultural inferences about ground-level conditions on the farm, as described herein.

In various implementations, field knowledge system 104 may be implemented across one or more computing systems that may be referred to as the "cloud." Field knowledge system 104 may receive vision data generated by farm machinery $108_{1-M}$ (and/or farm machinery at other agricultural sites) and one or more satellites 109 and process it using various image processing techniques to perform tasks such as detection, classification, and/or segmentation of plants and detecting and/or classifying attributes of the plants. In various implementations, field knowledge system 104 may include a vision data module 114 and an inference module 118. In some implementations one or more of modules 114 and 118 may be omitted, combined, and/or implemented in a component that is separate from field knowledge system 104.

Field knowledge system 104 may also include one or more databases. For example, field knowledge system 104 may include, in communication with vision data module 114, an imagery database 116 for storing image data captured by, for instance, agricultural personnel and/or farm machinery $108_{1-M}$ and/or satellite 109. Field knowledge system 104 may also include a machine learning model database 120 that includes the various machine learning models described herein. For example, database may include models that are trained to detect plants and/or plant attributes in digital imagery, as wells as generator machine learning models that are conditioned/biased using techniques described herein to generate ground-level synthetic data that is tailored towards conditions and/or attributes of specific agricultural areas, such as the current season, etc. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as farm machinery $108_{1-M}$ and satellite(s) 109. Vision data module 114 may then provide this imagery data to inference module 118 and/or to conditioning module 122. In other implementations, vision data module 114 may be omitted and the functions described herein as being performed by vision data module 114 may be performed by other components of field knowledge system 104, such as inference module 118.

Conditioning module 122 may be configured to condition or bias air-to-ground and ground-to-air generator machine learning models for a particular agricultural area 112 by biasing them using ground-level and high-elevation vision data for the particular agricultural area 112. The conditioned machine learning models will then be used by inference module 122 to ensure that agricultural personnel receive synthetic ground-level data that is biased towards, and therefore more representative of, their particular agricultural area. The machine learning models conditioned by conditioning module 122 and the conditioning processes will be discussed in more detail with respect to FIGS. 2-4.

Inference module 118 may be configured to apply imagery data received from vision data module 114 as input across the machine learning models stored in machine learning model database 120 to generate output. This output may be indicative of plants having certain attributes that are detected and/or classified based on ground-level imagery data received from vision data module 114. To this end, machine learning models stored in database 120 may be trained to detect, classify, and/or segment plants and/or attributes of those plants included in ground-level imagery of agricultural area(s) 112.

Various types of machine learning models may be trained to detect, classify, and/or segment plants and/or attributes of those plants based on ground-level imagery data. In some implementations, a convolutional neural network ("CNN") may be trained to generate output indicative of the presence and/or absence of certain attributes in plants depicted in digital imagery.

For example, one or more of the machine learning models used by inference module 118 may include one or more of the generator machine learning models conditioned or biased by conditioning module 122. As another example, one or more of the machine learning models used by inference module 118 may include a phenotyping agricultural machine learning model. In FIG. 1, for instance, inference module 118 can be configured to generate annotated image(s) that include pixel-wise and/or bounding shape annotations identifying one or more plants and/or their attributes. These annotations may be used, for instance, to segment the digital image into portions showing plants having certain attributes, such as weeds, diseased plants, certain leaf configurations, plants having some desired characteristic, etc.

In some implementations, one or more components of field knowledge system 104 may be implemented in whole or in part on farm machinery 108. For example, inference module 118 may be implemented in whole or in part on farm machinery 108 that is also equipped with a vision sensor such as a two-dimensional camera. By having an onboard inference module 118, farm machinery 108 may be able to process its own images to quickly detect plants having certain attributes. In some implementations, farm machinery 108 may include one or more additional modules (not shown) used for controlling portions of the farm machinery 108 to perform certain agricultural functions (e.g., to pull identified weeds from a particular field).

Inference module 118 may pass the ground-level data indicative of agricultural inferences about crop conditions in a given agricultural area 112, which may include real and/or synthetic ground-level image data of the agricultural area 112, to output module 124. Output module 124 may be configured to provide the ground-level inference data to one or more client devices 106 via AG clients 107 over network(s) 110. In some implementations, output module 124 may additionally or alternatively provide the ground-level inference data to one or more remote servers or databases via network(s) 110, and AG clients 107 on client devices 106 may obtain access to the ground-level inference data from the one or more remote servers or databases.

In some implementations, AG client 107 installed on one or more client devices 106 can provide synthetic ground-level image data for display on the user interface of the client device(s) 106. In such implementations, agricultural personnel can provide user input to the user interface selecting at least a portion of one or more instances of ground-level image data (e.g., selecting a portion of a synthetic ground-level image), and AG client 107 can provide user selection data indicating the user selection to inference module 118 (and/or one or more servers in communication with AG client 107 can). In response to receiving this indication of a user selection, inference module 118 can then provide, for display on the user interface of the client device(s) 106 via AG client(s) 107, one or more agricultural inference relevant to the user selection.

Figure 2:
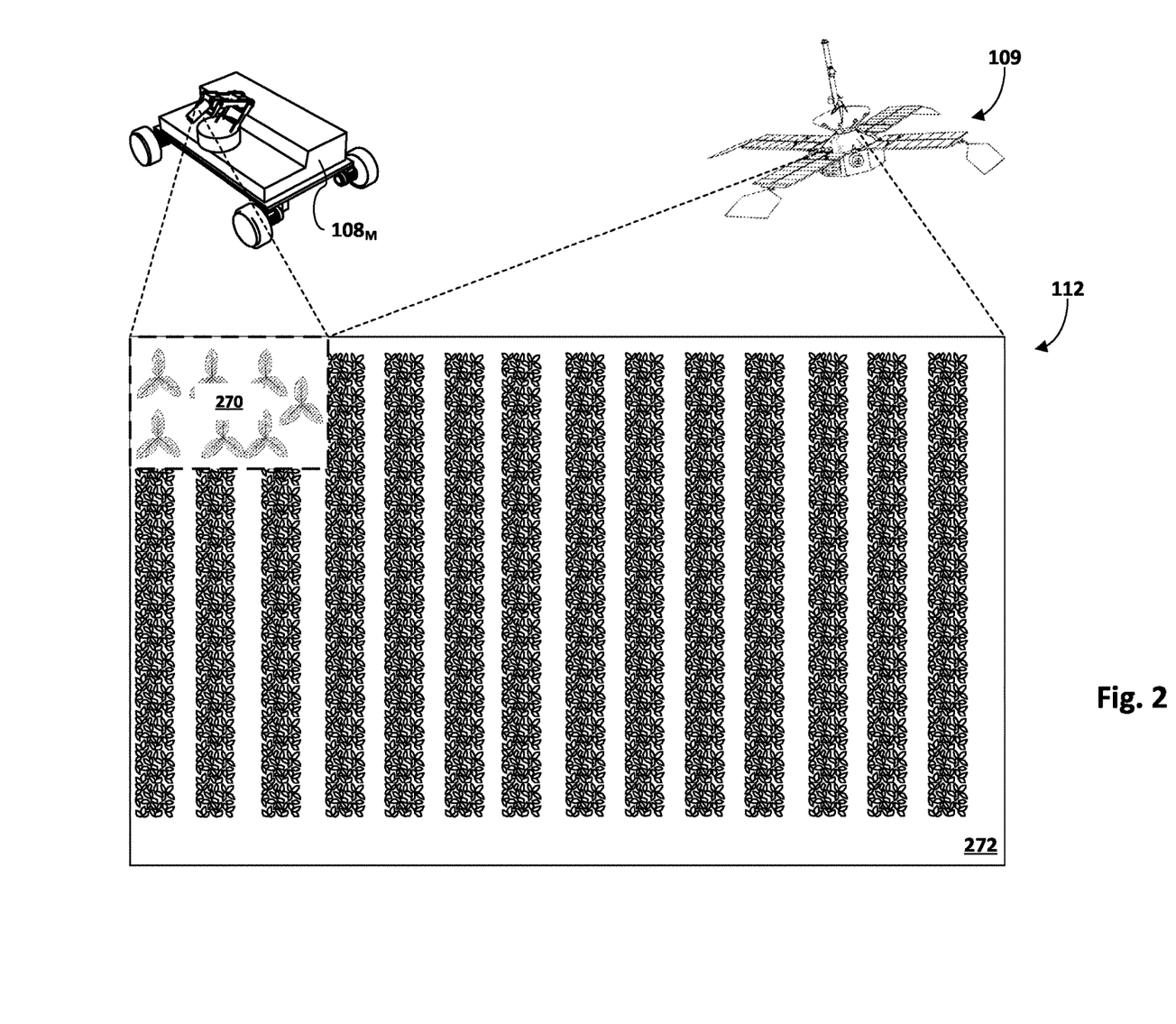
FIG. 2 is a block diagram illustrating a cyclic generative-adversarial neural network.

FIG. 2 schematically depicts an example environment in which one or more selected aspects of the present disclosure may be implemented, in accordance with various implementations. The example environment includes a specific agricultural area 112, farm machinery $108_M$ that may be deployed at or near that area 112, and a satellite 109 orbiting above the agricultural area 112. The farm machinery $108_M$ and the satellite 109 each capture a portion of the specific agricultural area 112 using one or more vision sensors.

The processes described with respect to FIG. 2 can be performed by various components of the system described with respect to FIG. 1. Particularly, the processes described with respect to FIG. 2 can be performed by one or more components of the field knowledge system 104 in order to condition various machine learning models for the specific region in which the particular agricultural field exists.

In the example environment of FIG. 2, agricultural personnel on a particular farm have implanted vision sensors mounted on farm machinery $108_M$ to capture various portions of various agricultural fields present on the farm. However, due to constraints with respect to budget, time, materials, storage, convenience, etc., it is impractical for the agricultural personnel to deploy enough farm machinery $108_M$ with a high enough frequency to capture up-to-date ground-level imagery of every portion of every field on the farm. Rather, the farm machinery $108_M$ will only practically be able to capture one or more portions 270 of one or more fields 112 on the farm each time it is deployed and capturing image data.

Image data capturing an entire field 112 may be available in the form of high-elevation satellite imagery. High-elevation satellite image data can be processed using an air-to-ground generator machine learning model to generate output in the form of ground-level agricultural inference data, including ground-level image data. However, an air-to-ground generator machine learning model that is generally configured to generate ground-level agricultural inference data from high-elevation satellite imagery will need to first be conditioned, or "biased", towards features of a particular agricultural region in order to provide agricultural personnel on a given farm with highly accurate agricultural inference data.

The system of FIG. 2 employs one or more conditioning processes to condition various machine learning models that process high-elevation satellite image data capturing an entire agricultural region and/or ground-level image data capturing various portions of that agricultural region in order to generate various agricultural inferences. As a result of these conditioning processes, the air-to-ground generator machine learning model will "learn" mappings between the agricultural features of a region captured in ground-level imagery and in high-elevation satellite imagery.

The system of FIG. 2 can thus provide agricultural personnel working on a particular farm with ground-level agricultural inference data tailored to their specific agricultural region, sub-region, farm, or even field. For example, the system of FIG. 2 may be more able to identify unwanted intrusive plants (i.e., weeds) in a particular field after being conditioned based on ground-level images capturing the local flora of the region. These conditioning processes will be discussed in more detail below with respect to FIGS. 3 and 4.

Figure 3:
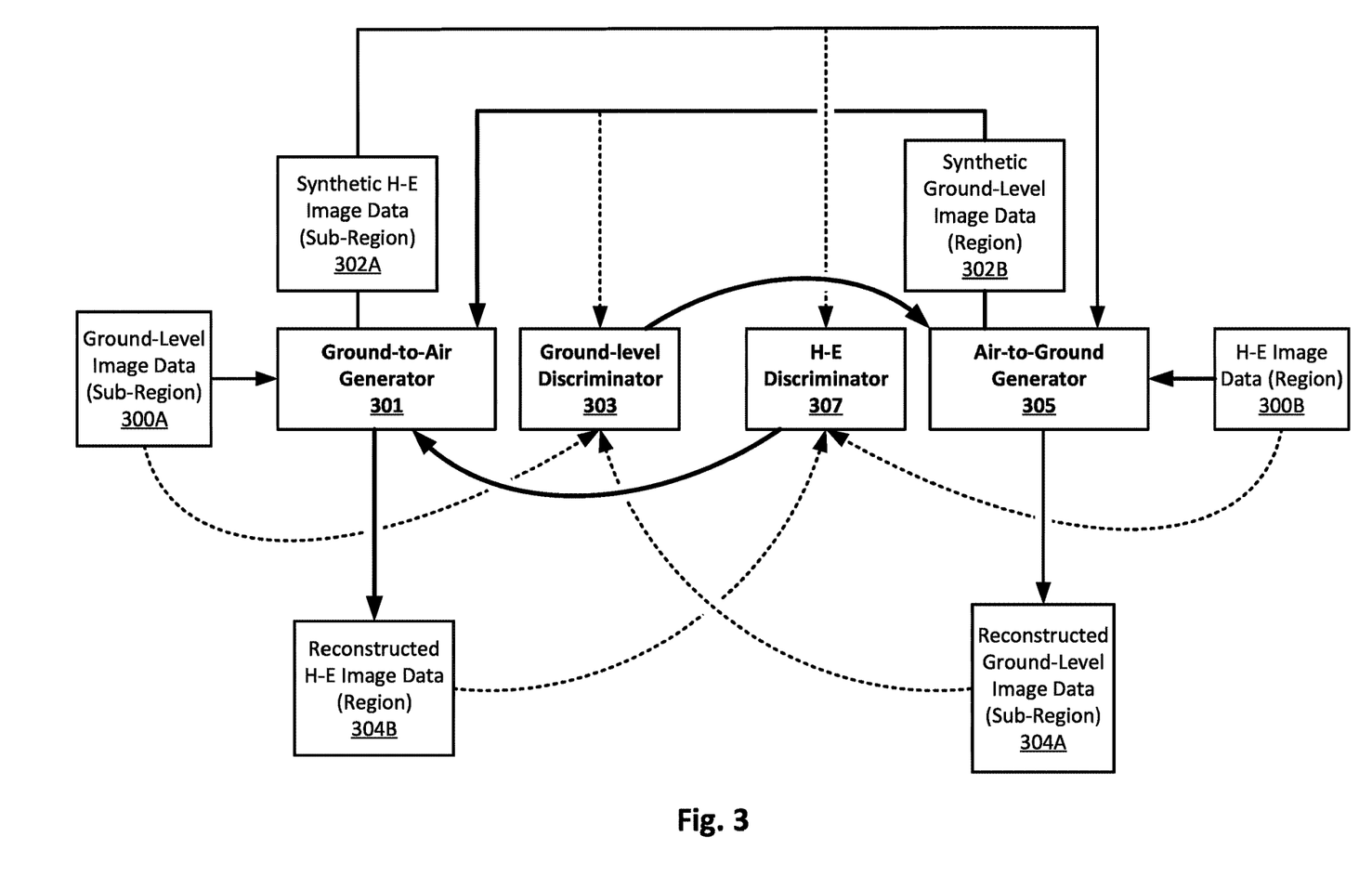
FIG. 3 depicts an example environment in which selected aspects of the present disclosure may be employed in accordance with various implementations.

FIG. 3 is an example block diagram that illustrates a cyclic generative-adversarial neural network (e.g., Cycle-GAN) schema. The elements depicted in FIG. 3 may be implemented across various components of various computer systems, such as one or more components of computing system(s) that implement field knowledge system 104. Moreover, while techniques described with respect to FIG. 3 may be discussed in a particular order, this is not meant to be limiting. One or more techniques discussed herein may be reordered, omitted or added.

The schema of FIG. 3 includes a ground-to-air generator machine learning model 301 and its associated high-elevation ("H-E" in FIG. 3) discriminator machine learning model 307, as well as an air-to-ground generator machine learning model 305 and its associated ground-level discriminator machine learning model 303.

The ground-to-air generator machine learning model 301 of FIG. 3 may be used to generate synthetic high-elevation image data 302A, 304B for a specific agricultural region based on ground-level image data 300A capturing one or more specific sub-regions of that specific agricultural region (e.g., capturing one or more farms, one or more fields, or portions of such). High-elevation discriminator machine learning model 307 is configured to distinguish real high-elevation image data 300B (e.g., satellite image data) from synthetic high-elevation image data 302A, 304B and output a discrimination result (e.g., "real" or "synthetic").

The air-to-ground generator machine learning model 305 of FIG. 3 is configured to generate synthetic ground-level image data 302B, 304A for one or more sub-regions of a specific agricultural region based on high-elevation image data 300B (e.g., satellite image data) capturing that specific agricultural region, or capturing at least a majority of that specific agricultural region (e.g., where some portions of that region are obscured by clouds). Its associated ground-level discriminator machine learning model 303 is configured to distinguish real ground-level image data 300A from synthetic ground-level image data 302B, 304A and output a discrimination result (e.g., "real" or "synthetic").

In the example embodiment of FIG. 3, ground-level image data 300A, which captures one or more sub-regions of a specific agricultural region, is applied as input across the ground-to-air generator machine learning model 301. Application of the ground-to-air generator machine learning model 301 generates, based on this input, synthetic high-elevation image data 302A representing the one or more sub-regions of the agricultural region. The synthetic high-elevation image data 302A representing the one or more sub-regions of the agricultural region is applied as input across the air-to-ground generator machine learning model 305. Application of the air-to-ground generator machine learning model 305 generates, based on this input, reconstructed ground-level image data 304A of the one or more sub-regions of the agricultural region (i.e., a synthetic ground-level version of the synthetic high-elevation imagery).

Likewise, high-elevation image data 300B capturing the specific agricultural region (or at least the majority of the region) is applied as input across the air-to-ground generator machine learning model 305. Application of the air-to-ground generator machine learning model 305 generates, based on this input, synthetic ground-level image data 302B representing the specific agricultural region. This synthetic ground-level image data 302B representing the specific agricultural region is applied as input to the ground-to-air generator machine learning model 301. Application of the ground-to-air generator machine learning model 301 generates, based on this input, reconstructed high-elevation image data 304B of the specific agricultural region (i.e., a synthetic high-elevation version of the synthetic ground-level imagery).

As indicated by the dashed lines in FIG. 3, the ground-level image data 300A, the synthetic ground-level image data 302B, and the (synthetic) reconstructed ground-level image data 304A are provided as inputs to the ground-level discriminator machine learning model 303. The ground-level discriminator machine learning model 303 makes a determination with respect to each as to whether these data represent "real" or "synthetic" ground-level image data. The ground-level image data 300A, the synthetic ground-level image data 302B, and the (synthetic) reconstructed ground-level image data 304A, as well as the "real/synthetic" determinations made by the ground-level discriminator machine learning model 303 based on such, are used to adjust the weights of the air-to-ground generator machine learning model 305 the ground-level discriminator machine learning model 303, and/or in some cases, the ground-to-air generator machine learning model 301.

The output of the ground-level discriminator machine learning model 303 may be compared to ground truth labels assigned to various image data indicating whether it is synthetic or real. To the extent to which any synthetic image data is predicted by the ground-level discriminator machine learning model 303 to be real, that may constitute a GAN loss. This GAN loss may be used to train the ground-level discriminator machine learning model 303, e.g., using techniques such as gradient descent, back propagation, etc.

As is also indicated by dashed lines in FIG. 3, the high-elevation image data 300B, the synthetic high-elevation image data 302A, and the (synthetic) reconstructed high-elevation image data 304B are applied as inputs across the high-elevation discriminator machine learning model 307. The high-elevation discriminator machine learning model 307 makes a determination with respect to each as to whether they represent "real" or "synthetic" high-elevation image data. The high-elevation image data 300B the synthetic high-elevation image data 302A, and the (synthetic) reconstructed high-elevation image data 304B, as well as the "real/synthetic" determinations made by the high-elevation discriminator machine learning model 307 based on such, are used to adjust the weights of the ground-to-air generator machine learning model 301, the high-elevation discriminator machine learning model 307, and/or the air-to-ground generator machine learning model 305.

The output of the high-elevation discriminator machine learning model 307 may be compared to ground truth labels assigned to various image data indicating whether it is synthetic or real. To the extent to which any synthetic image data is predicted by the high-elevation discriminator machine learning model 307 to be real, that may constitute a GAN loss. This GAN loss may be used to train the high-elevation discriminator machine learning model 307, e.g., using techniques such as gradient descent, back propagation, etc.

Through successive rounds of this conditioning process, the air-to-ground generator machine learning model 305 and the ground-to-air generator machine learning model 301 will be tailored or biased to the specific agricultural region. The air-to-ground generator machine learning model 305 will thus be able to produce more accurate synthetic ground-level image data from real high-elevation image data of the specific agricultural region. Likewise, the ground-to-air generator machine learning model 301 will be able to produce more accurate synthetic high-elevation image data from real ground-level image data of the specific agricultural region.

Figure 4:
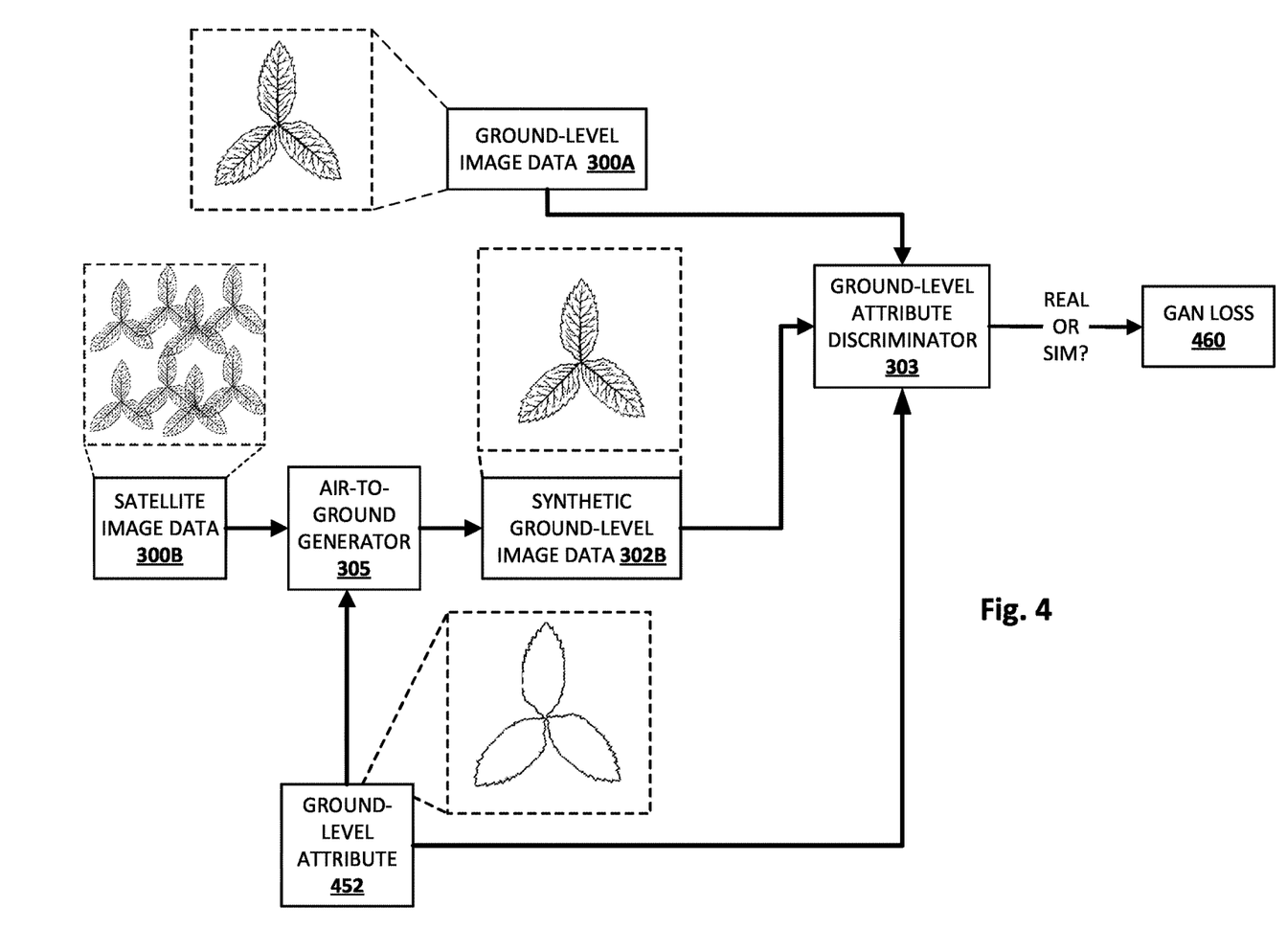
FIG. 4 depicts an example of how a generative adversarial network may be conditioned or biased towards a particular agricultural area, in accordance with various implementations.

FIG. 4 depicts, in somewhat greater detail, how the air-to-ground generator machine learning model 305 of the conditioned cycleGAN schema of FIG. 3 may be biased towards a specific agricultural region (e.g., a particular farm, a particular field). The techniques demonstrated by FIG. 4 may or may not be practiced in conjunction with the conditioning techniques described previously. Elements of FIG. 4 may be implemented by various components of various computer systems, such as one or more components of computing system(s) that implement field knowledge system 104 and/or one or more other components described with respect to FIGS. 1-3.

In FIG. 4, ground-level image data 300A capturing a portion of a particular agricultural field can be processed using ground-level discriminator machine learning model 303 configured to generate output indicative of whether those images are real or synthetic. The output may be compared to labels to train the ground-level discriminator machine learning model 303 as described previously. Synthetic ground-level image data 302B is also processed by the ground-level discriminator machine learning model 303 to generate output indicative of whether those images are real or synthetic, and the output may be compared to labels as described above in order to train the ground-level discriminator machine learning model 303.

Synthetic ground-level image data 302B is generated by the air-to-ground generator machine learning model 305 based on the high-elevation image data 300B (e.g., satellite image data) capturing the entirety of the particular field and based on one or more ground-level attributes 452. Ground-level attribute(s) 452 may act as constraint(s) that bias the generation of synthetic ground-level image data 302B based on conditions observed in the portion of the particular agricultural field captured by the real ground-level image data 300A. Ground-level attribute(s) 452 may be determined based on analysis of the ground-level image data 300A (e.g., by one or more of the machine learning models discussed herein), from ground-level sensor data (e.g., moisture sensors, soil sensors, sunlight sensors, etc.), manually-input agricultural stewardship data (e.g., applied fertilizer, applied irrigation, historical crop rotation, etc.), climate data, etc. In some implementations, the ground-level attribute(s) 452 may be provided by agricultural personnel. For example, agricultural personnel may view ground-level image data 300A on AG Client 107 installed on one or more client devices 106, and they may trace their finger on a touchscreen user interface to highlight an attribute to submit to the system of FIG. 4. Or, the ground-level agricultural personnel may manually inspect crops on the ground and provide their own observed data point(s).

As shown in FIG. 4, high-elevation image data 300B captures lower-granularity images of rows of crops in the particular agricultural field, while ground-level image data 300A captures higher-granularity versions of crops in a small portion of the particular agricultural field. With many overlapping leaves, it may be difficult to discern the leaf pattern of the crops growing in the particular agricultural field based on the high-elevation image data 300B alone. However, it is much easier to make out the three-leaf structure of the crops in the ground-level image data 300A. Thus, the three-leaf configuration may be extracted as a feature from the ground-level image data 300A and applied as a ground-level attribute 452 using air-to-ground generator machine learning model 305 in generating the synthetic ground-level image data 302B from the high-elevation image data 300b. As depicted in FIG. 4, the synthetic ground-level image data 302B includes the same three-leaf configuration of the ground-level attribute 452, despite the fact that the low image granularity and/or configuration of crops in the particular field makes it difficult or impossible to ascertain this configuration from the high-elevation image data 300B alone.

In some embodiments, the elements of FIG. 4 may be used to generate training data for training the air-to-ground generator machine learning model 305, in which case, the ground-level attributes 452 may be learned by air-to-ground generator machine learning model 305 as part of the Cycle-GAN-based training process described previously. When used to generate training data, unpaired image data from multiple regions, sub-regions, farms, and/or fields may be used. In these cases, synthetic image training data generated based on high-elevation image data along with non-corresponding ground-level image data (and therefore, also, non-corresponding ground-level attributes) may comprise negative training examples, while synthetic image training data generated based on high-elevation and ground-level image data from corresponding geographical areas may comprise positive training examples.

Figure 5:
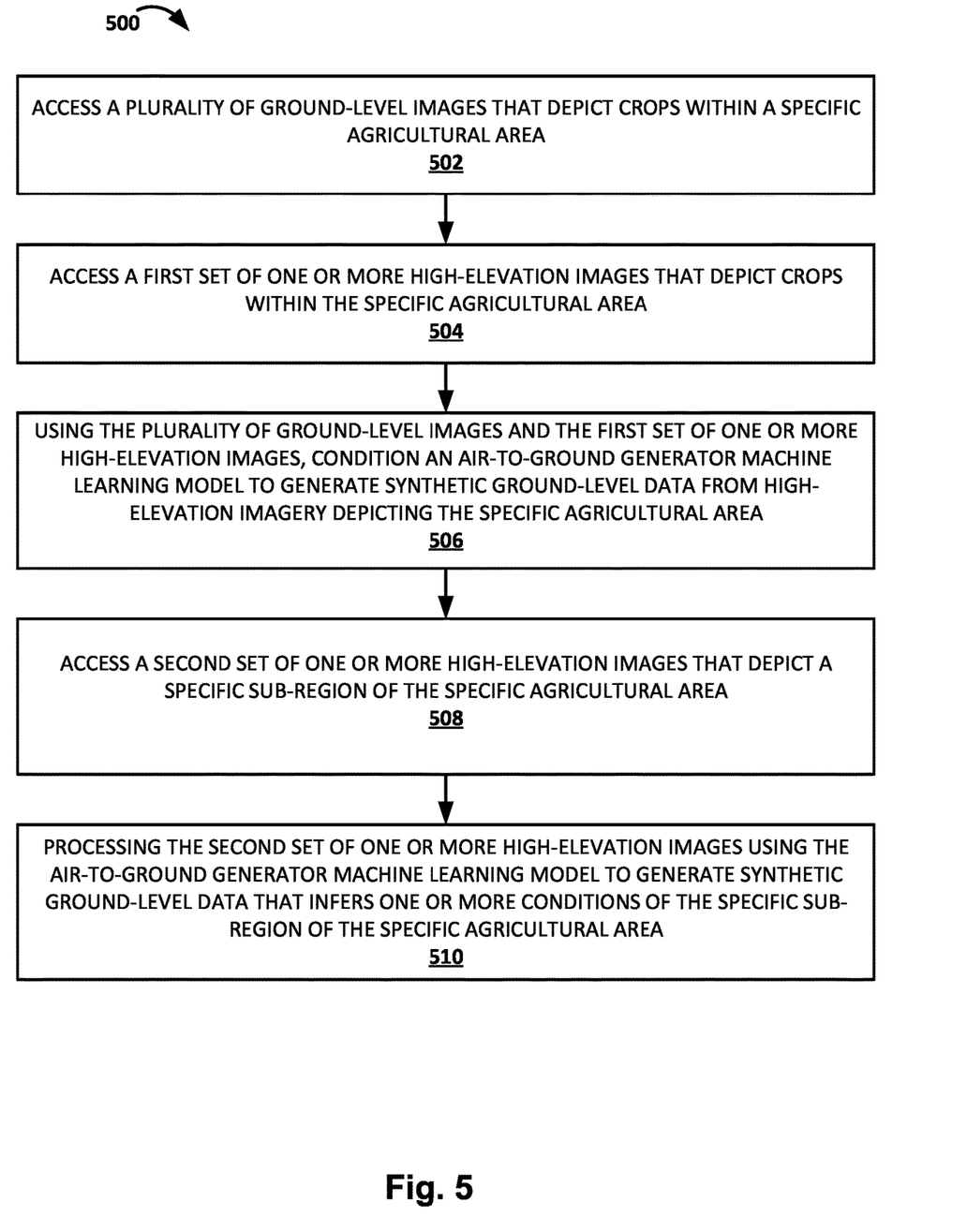
FIG. 5 depicts a flowchart illustrating an example method according to implementations disclosed herein.

FIG. 5 is a flowchart illustrating an example method 500 according to implementations disclosed herein. For convenience, the operations of the flow charts of FIG. 5 are described with reference to a system that performs the operations. This system may include various components of various computer systems, such as one or more components of computing system(s) that implement field knowledge system 104 and/or one or more other components described with respect to FIGS. 2-4. Moreover, while operations of method 500 are shown in a particular order, this is not meant to be limiting. One or more operations may be reordered, omitted or added.

At block 502, the system accesses a plurality of ground-level images that depict crops within a specific agricultural area, such as a particular field or a particular grower's or co-op's field(s). The ground-level images can be captured by vision sensors carried through an agricultural field 112. These vision sensor(s) may be included in modular computing device(s) 105 mounted on farm machinery (e.g., tractor $108_1$ or a boom affixed thereto), may be integral with agricultural robots/rovers (e.g., $108_M$), etc. Each ground-level image of the plurality of ground-level images will capture a portion of the specific agricultural area, such as a specific plant, or a specific portion of a row of plants. The system can access the plurality of ground-level images directly from the equipment that captures them and/or from one or more databases.

At block 504, the system accesses a first set of one or more high-elevation images that depict crops within the specific agricultural area. The high-elevation images can be captured by vision sensors integrated with one or more satellites 109. The high-elevation images of the first set of one or more high-elevation images may capture the entire specific agricultural area and/or various portions of the specific agricultural area. The system can access the first set of one or more high-elevation images from one or more databases and/or from images available publicly on the internet.

At block 506, the system uses the plurality of ground-level images and the first set of one or more high-elevation images to condition an air-to-ground generator machine learning model 305 to generate synthetic ground-level data from high-elevation imagery depicting the specific agricultural area. The system may condition the air-to-ground generator machine learning model 305 using the plurality of ground-level images and the first set of one or more high-elevation images according to one or more of the methods described with respect to FIGS. 2-4. As noted previously, this conditioning or biasing configures the air-to-ground generator machine learning model 305 to facilitate generation of synthetic ground-level data that more accurately predicts or infers conditions in the specific agricultural area, as opposed to more generic ground-level conditions.

At block 508, the system accesses a second set of one or more high-elevation images that depict a specific sub-region of the specific agricultural area. The high-elevation image(s) of the second set may depict the entire specific sub-region of the specific agricultural area and/or various portions of the specific sub-region of the specific agricultural area. The system can access the second set of one or more high-elevation images from one or more databases and/or from images available publicly on the internet. In some implementations, the second set of one or more high-elevation images that depict the specific sub-region of the specific agricultural area can include one or more portions of one or more of the high-elevation images of the first set. In some implementations, the second set of one or more high-elevation images that depict the specific sub-region of the specific agricultural area can include one or more additional high-elevation images that are not included in the first set.

At block 510, the system processes the second set of one or more high-elevation images using the air-to-ground generator machine learning model 305 to generate synthetic ground-level data that infers one or more conditions of the specific sub-region of the specific agricultural areas. In some implementations, the system may present the conditions inferred based on the synthetic ground-level data to one or more agricultural workers, such as via client device(s) 106. In some implementations, the system may additionally or alternatively store the synthetic ground-level data and/or the conditions inferred based on the synthetic ground-level data in one or more local or remote databases.

Figure 6:
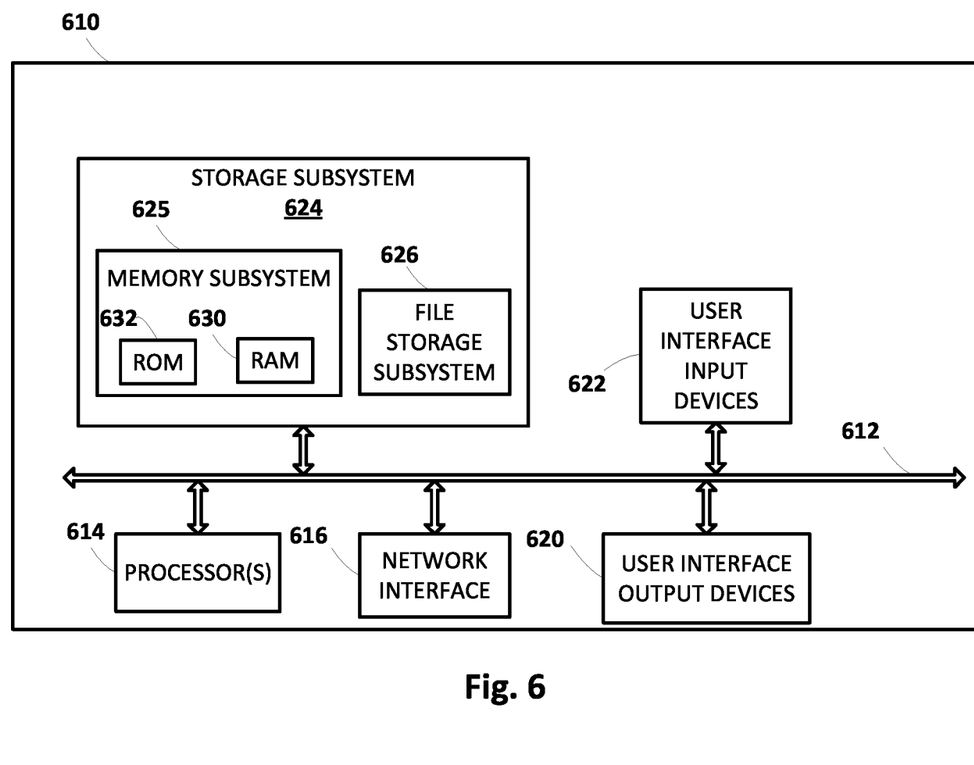
FIG. 6 illustrates an example architecture of a computing device.

FIG. 6 is a block diagram of an example computing device 610 that may optionally be utilized to perform one or more aspects of techniques described herein. In some implementations, one or more of a client device (e.g., client device 106), field knowledge system 104, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIGS. 3-6, as well as to implement various components depicted in FIGS. 1 and 2.

These software modules are generally executed by processor 614 alone or in combination with other processors. Memory 626 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented using one or more processors, comprising:
accessing a plurality of ground-level images that depict crops within a first area;
accessing a first set of one or more high-elevation images that depict a second area, wherein the second area includes the first area;
training an air-to-ground generator machine learning model to generate first synthetic ground-level data based on the first set of the one or more high-elevation images of the second area and the plurality of ground-level images of the first area;
accessing a second set of one or more high-elevation images that depict a third area, wherein the second area includes the first area and the third area, and wherein the second set of one or more high-elevation images include one or more portions of one or more of the high-elevation images of the first set, or one or more additional high-elevation images;
inferring a condition of the third area using the trained air-to-ground generator machine learning model, wherein the condition relates to a property of the crops within the first area; and
processing the second set of one or more high-elevation images using the trained air-to-ground generator machine learning model to generate second synthetic ground-level data depicting the third area that includes the condition.

2. The method of claim 1, wherein the second synthetic ground-level data that infers the condition of the third area includes synthetic ground-level images.

3. The method of claim 2, wherein the conditioning training includes:
processing the plurality of ground-level images based on a ground-to-air generator machine learning model to generate one or more synthetic high-elevation images;
processing the one or more synthetic high-elevation images based on a high-elevation discriminator machine learning model to generate high-elevation discriminator output; and
based on the high-elevation discriminator output, training the ground-to-air generator machine learning model.

4. The method of claim 3, wherein the conditioning training further includes:
processing the one or more synthetic high-elevation images based on the air-to-ground generator machine learning model to generate ground-level images;
processing the ground-level images based on a ground-level discriminator machine learning model to generate ground-level discriminator output; and
based on the ground-level discriminator output, training the air-to-ground generator machine learning model.

5. The method of claim 1, wherein at least one of the high-elevation images of the first set of one or more high-elevation images comprises includes a synthetic high-elevation image generated based on processing one or more of the ground-level images using a ground-to-air generator machine learning model.

6. The method of claim 2, further including processing the synthetic ground-level images based on a phenotyping machine learning model to generate one or more agricultural inferences about crops in the third area.

7. The method of claim 6, further including:
providing, to a remotely-operated client application, one or more of the synthetic ground-level images for display on a user interface of the remotely-operated client application;
receiving, from the remotely-operated client application, user selection data indicating a user selection of at least a portion of at least one of the one or more synthetic ground-level images displayed on the user interface of the remotely-operated client application; and providing, to the remotely-operated client application and responsive to receiving the user selection data, at least one of the one or more agricultural inferences for display on the user interface.

8. The method of claim 1, wherein the first set of one or more high-elevation images were captured by one or more satellites.

9. The method of claim 1, wherein the first set of one or more high elevation images were captured by one or more unmanned aerial vehicles (UAVs).

10. The method of claim 1, wherein the plurality of ground-level images were captured by a ground-based robot travelling through the first area.

11. A system comprising one or more processors and memory storing instructions that, in response to execution of the instructions by the one or more processors, cause the one or more processors to:

access a plurality of ground-level images that depict crops within a first area;

access a first set of one or more high-elevation images that depict a second area, wherein the second area includes the first area;

train an air-to-ground generator machine learning model to generate first synthetic ground-level data based on the first set of the one or more high-elevation images of the second area and the plurality of ground-level images of the first area;

access a second set of one or more high-elevation images that depict a third area, wherein the second area includes the first area and the third area, and wherein the second set of one or more high-elevation images include one or more portions of one or more of the high-elevation images of the first set, or one or more additional high-elevation images;

infer a condition of the third area using the trained air-to-ground generator machine learning model, wherein the condition relates to a property of the crops within the first area; and process the second set of one or more high-elevation images using the trained air-to-ground generator machine learning model to generate second synthetic ground-level data depicting the third area that includes of the condition.

12. The system of claim 11, wherein the second synthetic ground-level data that infers the condition of the third area includes synthetic ground-level images.

13. The system of claim 12, wherein to train the air-to-ground generator machine learning model includes:

processing the plurality of ground-level images based on a ground-to-air generator machine learning model to generate one or more synthetic high-elevation images;

processing the one or more synthetic high-elevation images based on a high-elevation discriminator machine learning model to generate high-elevation discriminator output; and based on the high-elevation discriminator output, training the ground-to-air generator machine learning model.

14. The system of claim 13, wherein to train the air-to-ground generator machine learning model further includes:

processing the one or more synthetic high-elevation images based on the air-to-ground generator machine learning model to generate ground-level images;

processing the ground-level images based on a ground-level discriminator machine learning model to generate ground-level discriminator output; and based on the ground-level discriminator output, training the air-to-ground generator machine learning model.

15. The system of claim 11, wherein at least one of the high-elevation images of the first set of one or more high-elevation images includes a synthetic high-elevation image generated based on processing one or more of the ground-level images using a ground-to-air generator machine learning model.

16. The system of claim 12, further including processing the synthetic ground-level images based on a phenotyping machine learning model to generate one or more agricultural inferences about crops in the third area.

17. The system of claim 16, wherein execution of the instructions causes the one or more processors to:

provide, to a remotely-operated client application, one or more of the synthetic ground-level images for display on a user interface of the remotely-operated client application;

receive, from the remotely-operated client application, user selection data indicating a user selection of at least a portion of at least one of the one or more synthetic ground-level images displayed on the user interface of the remotely-operated client application; and provide, to the remotely-operated client application and responsive to receiving the user selection data, at least one of the one or more agricultural inferences for display on the user interface.

18. The system of claim 11, wherein the plurality of ground-level images were captured by a ground-based robot travelling through the first area.

19. At least one non-transitory computer-readable medium comprising instructions that, in response to execution of the instructions by one or more processors, cause the one or more processors to:

access a plurality of ground-level images that depict crops within a first area;

access a first set of one or more high-elevation images that depict a second area, wherein the second area includes the first area;

train an air-to-ground generator machine learning model to generate first synthetic ground-level data from based on the first set of one or more high-elevation imagery images of the second area and the plurality of ground-level images of the first area;

access a second set of one or more high-elevation images that depict a third area, wherein the second area includes the first area and the third area, and wherein the second set of one or more high-elevation images include one or more portions of one or more of the high-elevation images of the first set, or one or more additional high-elevation images;

infer a condition of the third area using the trained air-to-ground generator machine learning model, wherein the condition relates to a property of the crops within the first area; and process the second set of one or more high-elevation images using the trained air-to-ground generator machine learning model to generate second synthetic ground-level data depicting the third area that includes the condition.

20. The at least one non-transitory computer-readable medium of claim 19, wherein at least one of the high-elevation images of the second set of one or more high-elevation images that depict the third area includes a synthetic high-elevation image generated based on processing one or more additional ground-level images, each capturing at least a portion of the third area, using a ground-to-air generator machine learning model.

21. A method implemented using one or more processors, comprising:

accessing a plurality of ground-level images that depict crops within a specific agricultural area;

accessing a first set of one or more high-elevation images that depict the specific agricultural area;

using the plurality of ground-level images and the first set of one or more high-elevation images, conditioning an air-to-ground generator machine learning model to generate synthetic ground-level data from high-elevation imagery depicting the specific agricultural area;

accessing a second set of one or more high-elevation images that depict a specific sub-region of the specific agricultural area, wherein the second set of one or more high-elevation images include: one or more portions of one or more of the high-elevation images of the first set, or one or more additional high-elevation images;

processing the second set of one or more high-elevation images using the air-to-ground generator machine learning model to generate synthetic ground-level data that infers one or more conditions of the specific sub-region of the specific agricultural area, wherein the synthetic ground-level data that infers the one or more conditions of the specific sub-region includes synthetic ground-level images; and processing the synthetic ground-level images based on a phenotyping machine learning model to generate one or more agricultural inferences about crops in the specific sub-region of the specific agricultural area.

22. The method of claim 21, further including:

providing, to a remotely-operated client application, one or more of the synthetic ground-level images for display on a user interface of the remotely-operated client application;

receiving, from the remotely-operated client application, user selection data indicating a user selection of at least a portion of at least one of the one or more synthetic ground-level images displayed on the user interface of the remotely-operated client application; and providing, to the remotely-operated client application and responsive to receiving the user selection data, at least one of the one or more agricultural inferences for display on the user interface.

23. A system comprising one or more processors and memory storing instructions that, in response to execution of the instructions by the one or more processors, cause the one or more processors to:

access a plurality of ground-level images that depict crops within a specific agricultural area;

access a first set of one or more high-elevation images that depict the specific agricultural area;

use the plurality of ground-level images and the first set of one or more high-elevation images, conditioning an air-to-ground generator machine learning model to generate synthetic ground-level data from high-elevation imagery depicting the specific agricultural area;

access a second set of one or more high-elevation images that depict a specific sub-region of the specific agricultural area, wherein the second set of one or more high-elevation images include: one or more portions of one or more of the high-elevation images of the first set, or one or more additional high-elevation images;

process the second set of one or more high-elevation images using the air-to-ground generator machine learning model to generate synthetic ground-level data that infers one or more conditions of the specific sub-region of the specific agricultural area, wherein the synthetic ground-level data that infers one or more conditions of the specific sub-region includes synthetic ground-level images; and process the synthetic ground-level images based on a phenotyping machine learning model to generate one or more agricultural inferences about crops in the specific sub-region of the specific agricultural area.

24. The system of claim 23, wherein execution of the instructions causes the one or more processors to:

provide, to a remotely-operated client application, one or more of the synthetic ground-level images for display on a user interface of the remotely-operated client application;

receive, from the remotely-operated client application, user selection data indicating a user selection of at least a portion of at least one of the one or more synthetic ground-level images displayed on the user interface of the remotely-operated client application; and provide, to the remotely-operated client application and responsive to receiving the user selection data, at least one of the one or more agricultural inferences for display on the user interface.

* * * * *